United States Patent
Taspinar et al.

(10) Patent No.: US 7,402,916 B2
(45) Date of Patent: Jul. 22, 2008

(54) METHOD OF CONTROLLING A REVERSIBLE, POLYPHASE ROTARY ELECTRICAL MACHINE FOR A MOTOR VEHICLE HAVING A HEAT ENGINE

(75) Inventors: Ertugrul Taspinar, Chatillon-sur-Chalaronne (FR); Jean-Marc Dubus, Evry (FR); Hugues Doffin, Créteil (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 120 days.

(21) Appl. No.: 10/555,062

(22) PCT Filed: May 6, 2004

(86) PCT No.: PCT/FR2004/001085
§ 371 (c)(1),
(2), (4) Date: Oct. 3, 2006

(87) PCT Pub. No.: WO2004/100351
PCT Pub. Date: Nov. 18, 2004

(65) Prior Publication Data
US 2007/0057511 A1  Mar. 15, 2007

(30) Foreign Application Priority Data
May 7, 2003  (FR) .................. 03 05592

(51) Int. Cl.
*H02P 9/00* (2006.01)
*H02K 17/12* (2006.01)

(52) U.S. Cl. .............. 290/22; 290/31; 322/28

(58) Field of Classification Search .......... 290/22, 290/31, 40 C; 322/28, 25
See application file for complete search history.

(56) References Cited

U.S. PATENT DOCUMENTS

| | | | | |
|---|---|---|---|---|
| 4,803,376 | A | * | 2/1989 | N'Guyen ............ 290/22 |
| 5,097,167 | A | | 3/1992 | Kanayama et al. |
| 5,182,500 | A | | 1/1993 | Shimada |
| 5,270,605 | A | | 12/1993 | Lefrancois et al. |
| 5,838,123 | A | | 11/1998 | Zhao |
| 5,988,137 | A | * | 11/1999 | Tamura et al. ............ 123/295 |
| 6,002,219 | A | | 12/1999 | Permuy |

(Continued)

FOREIGN PATENT DOCUMENTS

EP  0 260 176  3/1988

(Continued)

*Primary Examiner*—Nicholas Ponomarenko
(74) *Attorney, Agent, or Firm*—Berenato, White & Stavish

(57) ABSTRACT

The method of controlling a reversible, polyphase rotary electrical machine called an alternator-starter, for a motor vehicle with a heat engine, the machine being adapted to work either as an electric generator—in an alternator mode—or as an electric motor, in particular for starting the engine, the machine comprising a rotor with at least one excitation winding, a target and sensors, is characterised in that, starting from sensors of the linear type delivering signals of a sinusoidal type after reading of the target, a summation of the signals delivered by the sensors is performed in a processing unit, by applying a coefficient to the sensors to create signals which are out of phase with each other, and the number of which is equal to the number of sensors, and in that, for each out of phase signal, the sum of the coefficients is zero.

7 Claims, 5 Drawing Sheets

U.S. PATENT DOCUMENTS

| | | |
|---|---|---|
| 6,018,198 A * | 1/2000 | Tsuzuki et al. ................. 290/17 |
| 6,252,381 B1 * | 6/2001 | Schenk ........................ 322/28 |
| 6,486,585 B1 | 11/2002 | Badey et al. |
| 6,541,943 B1 * | 4/2003 | Wylie et al. .................... 322/28 |
| 6,894,402 B2 * | 5/2005 | Dubus et al. ............... 290/40 C |
| 7,221,127 B2 * | 5/2007 | Masson et al. ................. 322/28 |
| 7,265,463 B2 * | 9/2007 | Kusase et al. ................. 310/62 |
| 2002/0158523 A1 | 10/2002 | Abadia et al. |
| 2003/0011268 A1 | 1/2003 | Even et al. |
| 2003/0038482 A1 | 2/2003 | Dubus et al. |

FOREIGN PATENT DOCUMENTS

| | | |
|---|---|---|
| EP | 0 515 259 A1 | 11/1992 |
| EP | 0 715 979 B1 | 6/1996 |
| FR | 2 737 063 | 1/1997 |
| FR | 2 745 444 | 8/1997 |
| FR | 2 745 445 | 8/1997 |
| FR | 2 782 356 | 2/2000 |
| FR | 2 793 085 | 11/2000 |
| FR | 2 802 592 | 6/2001 |
| FR | 2 807 231 | 10/2001 |
| FR | 2 835 978 | 8/2003 |
| WO | WO 92/06527 | 4/1992 |
| WO | WO 01/45250 A1 | 6/2001 |
| WO | WO 01/69762 A1 | 9/2001 |
| WO | WO 01/93406 A1 | 12/2001 |
| WO | WO 02/50976 A2 | 6/2002 |
| WO | WO 02/054566 A1 | 7/2002 |
| WO | WO 02/060711 A1 | 8/2002 |

* cited by examiner

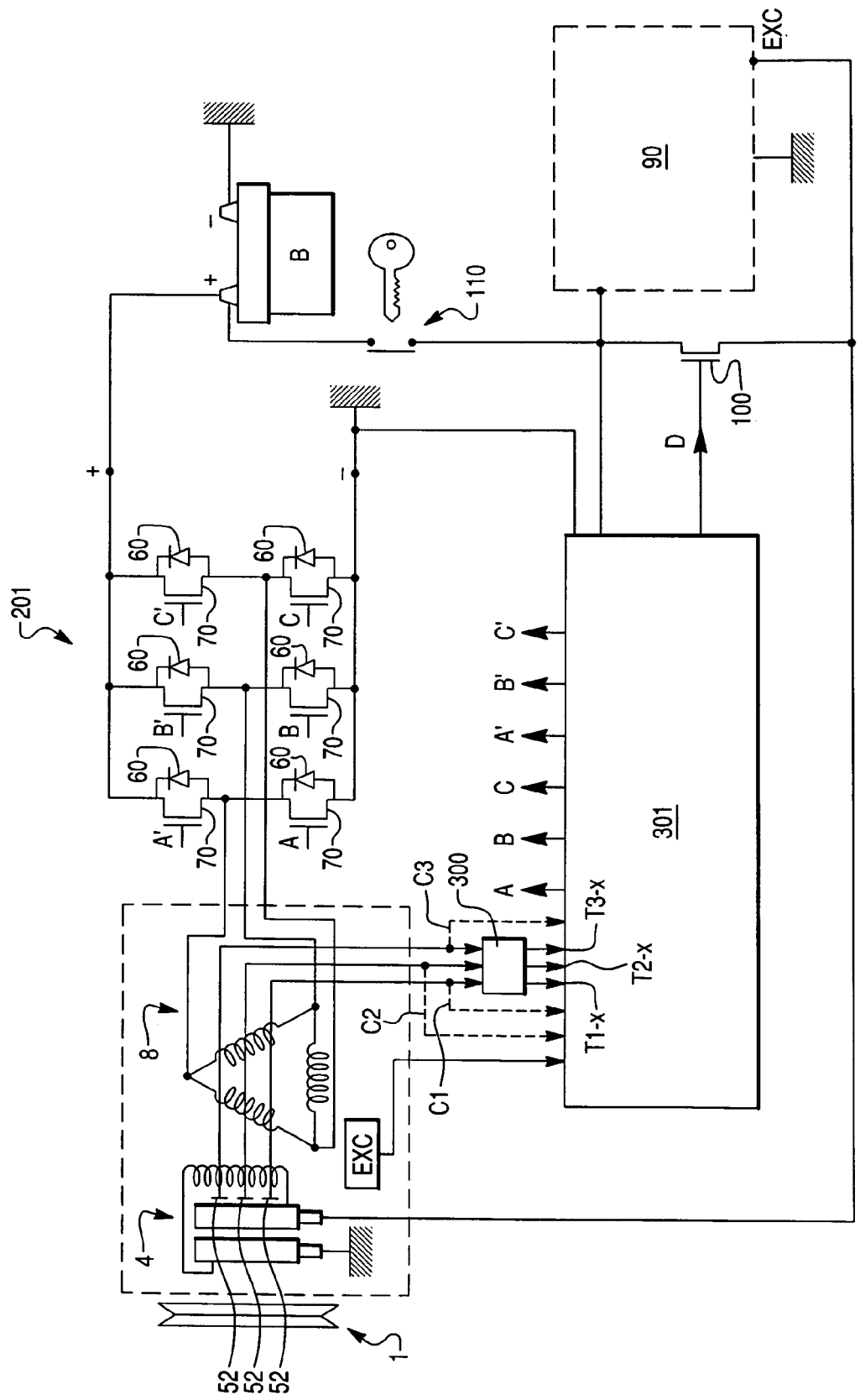

METHOD OF CONTROLLING A REVERSIBLE, POLYPHASE ROTARY ELECTRICAL MACHINE FOR A MOTOR VEHICLE HAVING A HEAT ENGINE

FIELD OF THE INVENTION

The present invention relates to a reversible rotary electrical machine such as an alternator-starter for a vehicle, especially a motor vehicle.

Such a machine is described for example in the documents EP-A-0 260 176 (U.S. Pat. No. 4,803,376), FR-A-2 745 444 and FR-A-2 745 445 (U.S. Pat. No. 6,002,219), to which reference may be made for more details.

This machine, which is of the reversible polyphase type, works as an alternator, that is to say an electric generator, in particular for the purpose of charging the battery of the vehicle, and also works as a starter, that is to say as an electric motor, in particular for driving the internal combustion engine, also referred to as a heat engine, of the motor vehicle, in order to start it.

To this end, the rectifier bridge at the output of the armature of the alternator also serves as a bridge for controlling the phases of the stator of the alternator.

CURRENT STATE OF THE ART

As is well known, the said rotary machine is, in one embodiment, associated with the engine flywheel of the motor vehicle, in which it is for example integrated, and therefore rotates at the same rotational velocity as the crankshaft of the engine of the motor vehicle which drives the engine flywheel in rotation, the flywheel being, in some cases, made in two parts so as to constitute a damping flywheel having resilient members which are interposed operatively between the two parts, or alternatively a flexible flywheel. In both cases, the rotor of the machine is carried by one of the said parts.

In another version, the reversible machine is driven in rotation by the crankshaft through an interposed motion transmission device such as a belt and pulley system. In that case, the machine rotates at a speed higher than that of the crankshaft.

In all cases, the rotary electrical machine comprises:

a wound rotor, that is to say a rotor which is provided with at least one excitation winding, which, when the machine is working as an alternator, constitutes the inductor which is normally associated with two slip rings and two brushes through which the excitation current is passed; and a polyphase or multiphase stator having a plurality of coils or windings, with at least one winding per phase, which constitute the armature when the machine is working as an alternator and which are either star connected or delta connected, the latter in the most frequent case of a three phase structure, with the stator windings delivering the converted electrical power to the rectifier bridge in the alternator mode.

The bridge is connected to the various phases of the armature and is connected between earth and a power supply terminal of the battery. The bridge has for example a plurality of arms, with diodes associated with transistors of the MOSFET type, or more generally with interrupters.

Operation in the electric motor mode of such a machine is effected by, for example, imposing a direct current in the inductor and by delivering synchronously on the phases of the stator the signals de-phased, or out of phase, by 120□, i.e. having a phase difference of 120□ between them, the signals being ideally sinusoidal, though they could be in trapezoidal or square form.

The said rectifier and control bridge is controlled by an electronic command and control module. The bridge and the command module are part of a unit, called a command and control unit, which is usually mounted on the outside of the machine. The bridge, associated with the windings of the phases of the stator, is part of a power stage and the module has a stage of lower power.

The said unit is associated with the machine and its electronic module includes a computer such as a microcontroller.

Means are also provided for following the angular position of the rotor, so that, in the electric motor mode, an electric current is injected at the appropriate moment into the appropriate phase and therefore into the winding or coil concerned of the stator.

According to a non-limiting aspect, these means are of a magnetic type, though in another version they may be of an optical type, delivering information to the electronic command and control module, and they are described for example in the documents WO01/69762 (US-A-2002/0158523) filed on 9 Mar. 2001.

The said means accordingly comprise a target which is rotatable with the rotor or the pulley of the machine, together with at least one sensor of the Hall Effect or magnetoresistive type for detecting the passage of the target, which is of the magnetic type in a non-limiting aspect.

According to a non-limiting aspect of the invention, at least three sensors are provided, the latter being carried by the front or rear bearing plate of the rotary electrical machine for supporting the stator in a fixed manner and for rotation of the rotor.

In the document EP-A-0 715 979, it is arranged that the machine will work as an auxiliary motor for the purpose of starting up the air conditioning apparatus of the motor vehicle and driving the compressor of that apparatus when the vehicle is at rest.

In the document WO01/45250, the machine is again arranged to work as an auxiliary motor, in particular when the engine of the vehicle is switched off at a red light.

In all cases, a command and control unit is provided which includes a switch which, firstly, enables the wound rotor of the machine to be connected to a voltage regulator device for controlling the intensity of the current flowing in the inductor when the machine is working as an electrical generator—i.e. in the alternator mode—and, secondly, to connect the stator of the machine to a control device such as a wave generator, which controls the phases of the winding sequentially with intervention by sensors for sensing the angular position of the rotor when the machine is working as an electric motor, in particular in the starting mode.

In the document WO02/060711 (US-A-2003/0038482) a method is described for controlling the machine in which, during operation as an electric motor, the said machine works in two modes which correspond to different characteristic curves of speed plotted against torque, namely a first or so-called starting mode which enables the engine of the vehicle to be driven for the purpose of starting the latter, with high torques at low speeds, while the second or auxiliary motor mode, permits driving of either the machine by itself or at least one power consuming item of equipment such as the compressor of an air conditioning apparatus, or a booster pump for power assisted steering, and/or the engine itself, all at higher speeds and lower torques than those in the starting mode, the said electrical machine being provided with a stator having phases, a rotor, and means for following the rotation of the rotor, the said means comprising sensors which are adapted to pass signals to the electronic module mentioned above of the unit for command and control of the phases of the stator. The items of information, having followed the form of the signals passed by the sensors to the electronic module of the said unit, are used firstly in a first order, called a direct order, while the electrical machine is working in its starting mode, and secondly in an order which is modified as compared with the direct order when the electrical machine is working in its auxiliary motor mode.

In the auxiliary motor mode, in contrast to the direct order, at least one permutation and one inversion of the signals passed by the sensors to the said unit are effected.

The auxiliary motor mode is activated when, in the starting mode, the rotational velocity of the electrical machine reaches a threshold value, called the activation speed, as can be seen at n in FIG. 1, before the power of the said machine dies away.

The permutation and inversion of the signals passed by the sensors to the said unit are obtained in such a way as to create a phase difference consisting of at least a pitch of –60☐ electric with respect to the said direct order.

The inversion and permutation of the signals passed by the sensors to the said unit are obtained through discrete elements such as logic gates of the AND type, associated with each sensor as can be seen in FIG. 2, in which C'1, C'2 and C'3 are three active signals which are delivered by the new sensors following the inversion and permutation of the signals for the velocity n.

Thanks to these arrangements, the reversible rotary electrical machine is used as an auxiliary electric motor in a range of speeds which is greater than that necessary for starting the heat engine. Thus, it is possible to stop the engine of the motor vehicle at a red light and to drive at least one accessory or an electrical load for example the compressor of the air conditioning apparatus, by means of the electrical machine. The engine can subsequently be restarted. In another version, the accessory is an auxiliary pump for a power assisted steering system, such that it is able to turn the wheels when the engine is stopped at a red light. In the auxiliary motor mode, it is of course possible to drive several electrical loads, or, in a modified version, to drive the machine by itself before it passes into its alternator mode.

OBJECT OF THE INVENTION

In the document WO02/060711, the signals delivered by the sensors are of the "all or nothing" (YES/NO or GO/NO GO) type, so that the torque delivered by the machine is augmented in the electric motor mode at a predetermined velocity.

With this type of signal it is difficult to adjust the signals from the sensors in order that, when the machine is working in its electric motor mode (starter mode and auxiliary mode), an optimum torque can be obtained as a function of the rotational velocity of the machine, because the instantaneous position of the rotor of the machine is not known with any precision.

In general terms, it is desirable to augment the torque delivered by the machine when it is working in the electric motor mode.

The object of the present invention is to mitigate this disadvantage and to respond to that desire in a simple and inexpensive way.

According to the invention, a method of controlling a reversible, polyphase rotary electrical machine of the type set forth above, including a rotor with at least one excitation winding, is characterised in that, starting from sensors of the linear type delivering signals of a sinusoidal type after reading the target, a summation of the signals delivered by the sensors is performed in a processing unit, by applying a coefficient to the sensors to create signals which are out of phase with each other and the number of which is equal to the number of sensors, and in that, for each de-phased (out of phase) signal, the sum of the coefficients is zero.

Thanks to the invention, the required precision is obtained in the perturbed environment of the electrical machine, while the torque delivered by the machine and/or the output of the latter are augmented when the machine is working in its electric motor mode.

It is thus possible to increase the performance of the machine so as to be able to set the vehicle in motion to the best advantage on starting, or to avoid stalling of the engine of the vehicle, the machine then performing a "boost" function at lower speeds of rotation of the engine of the motor vehicle.

In general terms, as compared with the prior art, when the machine is working in its electric motor mode:

the current is limited in the wave generator while having lower offsets of the signals from the sensors;

the torque from the machine is augmented at speeds of rotation of the latter which are lower than that in the prior art; and it is possible to obtain offsets which are continuously variable over the whole range of speeds of rotation of the machine, so as to obtain an optimum torque delivered by the machine in the electric motor mode over the whole of the said range.

According to an aspect which is not limiting, the means for following the rotation of the rotor are of the magnetic type.

In one embodiment, the sensors are Hall Effect sensors of the linear type or linear sensors of the magnetoresistive type.

BRIEF DESCRIPTION OF THE DRAWINGS

Further features and aspects of the invention, which are in no way limiting, will become more evident from the following description, which is purely by way of illustration and is not limiting, and which should be read with reference to the attached drawings, in which:

FIG. 8 is a diagrammatic view of the rotary electrical machine according to the invention.

DESCRIPTION OF SOME EMBODIMENTS OF THE INVENTION

Figure 1:
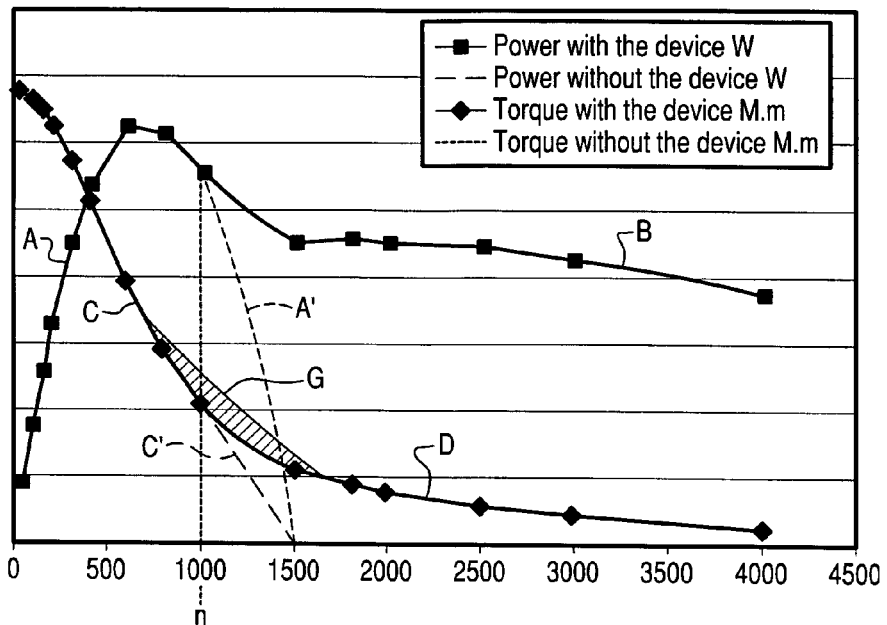
FIG. 1 shows, in accordance with the document WO02/060711, the characteristic curves (torque and power as a function of rotational velocity, and more precisely the number of rotations per minute)—namely those of the rotor of the machine—which are proportional to those of the engine of the vehicle.

In the drawings, the reversible rotary electrical machine of the polyphase type is an alternator-starter of the type described above and described for example in the above mentioned document WO01/69762 (US-A-2002/0158523).

In this case the machine has the structure of a conventional alternator, which is for example of the same type as that described in the document EP-A-0 515 259 (U.S. Pat. No. 5,270,605), to which reference should be made for more detail.

This machine (see FIG. 3) is one that has internal ventilation (that is to say air cooling), with its claw-type rotor carrying at least one of the axial ends of the fan 43, 44 which has blades 45. In a modified version, the machine may be water cooled.

Figure 3:
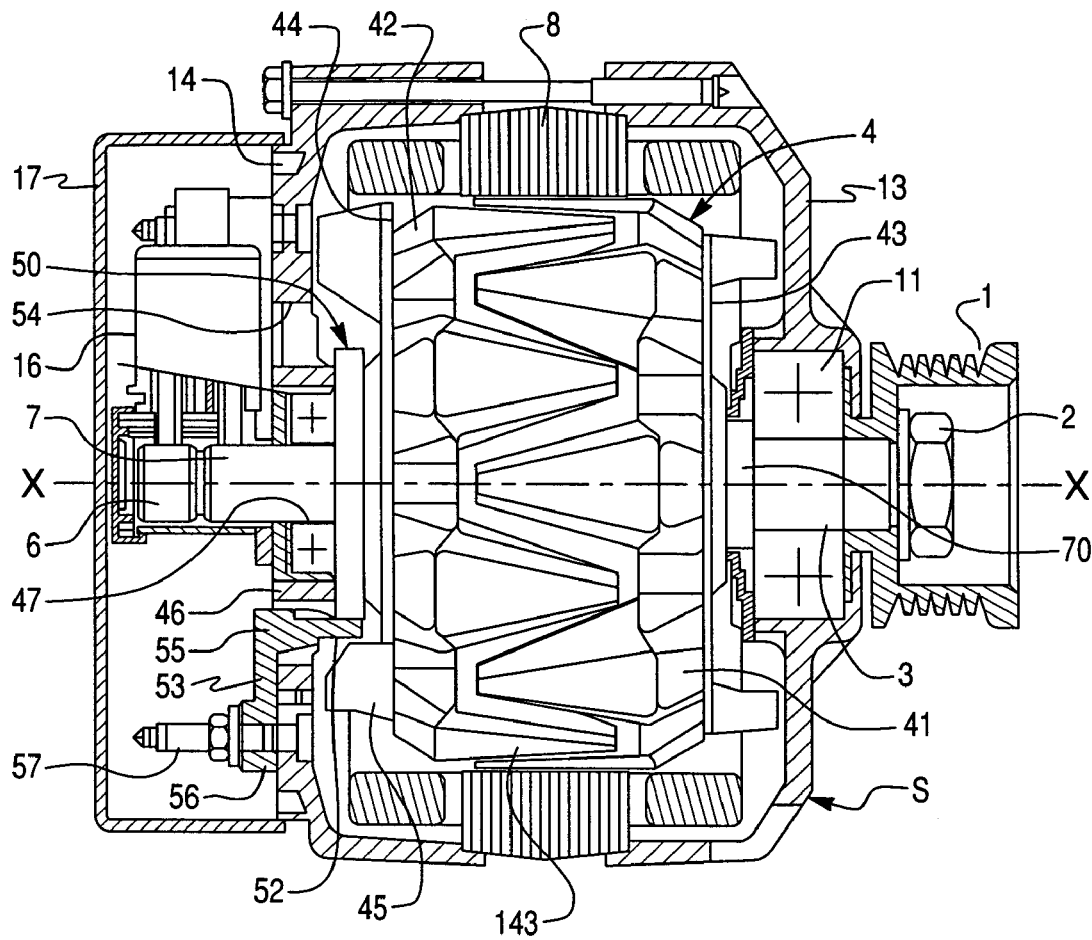
FIG. 3 is a view in axial cross section, without axial sectioning of the rotor of the target and target carrier, in an alternator-starter in accordance with the document WO02/060711.

In FIG. 3, the claw-type rotor 4 includes pole wheels 41 and 42 which carry teeth 143 at their outer periphery, these teeth being oriented axially and being generally of trapezoidal form. The teeth 143 of one of the pole wheels are directed towards the teeth of the other pole wheel. The said teeth are spaced apart in such a way that they are interleaved as between one pole wheel and the other.

As described in the document FR-A-2 793 085 (U.S. Pat. No. 6,486,585), permanent magnets may of course be interposed between the teeth of the pole wheels, in order to increase the magnetic field. The said teeth project from the outer periphery of a transverse plate which is comprised in each of the pole wheels 41 and 42.

The rotor 4 carries a central excitation winding between the transverse plates of its pole wheels. This winding can be seen for example in FIG. 3 of the document WO01/69762, and is carried by cores which project from the transverse plates of the wheels 41 and 42, or by a core which constitutes a spacer between the said transverse plates.

The excitation winding includes an electrically conductive element which is wound as a coil, in loops or turns. When the excitation winding is activated, it magnetises the rotor 4 so as, with the aid of the teeth 143, to create pairs of north and south magnetic poles. The ends of the winding of the rotor are each connected to a slip ring 6, 7, on each of which a brush (not given a reference numeral) is in rubbing engagement. The brushes are carried by a brush carrier 16 which is fixed with respect to the rear bearing plate 14 of the machine, which carries a central ball bearing (not given a reference numeral), the latter carrying, for rotation in it, the rear end portion of the shaft 3 which carries the rotor 4, the rotor being fixed to the shaft by a knurled portion in this case.

The front end of the shaft 3 is supported in rotation by a ball bearing 11 which is carried by the front bearing plate 13 of the machine. The front end portion of the shaft carries, outside the machine, a motion transmitting member in the form of a pulley 1 which is part of a motion transmitting device that includes at least one belt in engagement with the pulley. The motion transmission device couples the pulley with a member, such as another pulley, which is driven in rotation by the internal combustion engine of the vehicle. The shaft 3 is threaded at its front end for fastening of the pulley 1, which is internally hollow, with the aid of a nut 3 as can be seen in FIG. 1. The axial axis of symmetry X-X defines the axis of rotation of the rotary electrical machine, which in this example is of the three phase type.

When the machine—which in this case is an alternator-starter—is working in alternator mode, that is to say it is working as an electrical generator, the pulley is driven in rotation by the internal combustion engine of the vehicle via at least the above mentioned belt.

When the machine is working in its starter mode, that is to say as an electric motor, the pulley drives the engine of the vehicle in rotation via the belt.

In a modified version, the motion transmitting device comprises at least one chain, or at least one gear train, or at least one pinion, such that the pulley 1 may be replaced by a toothed wheel, a gear wheel, a pinion or any other member constituting the motion transmission device.

The front and rear bearings 13 and 14 are formed with openings in the known way for internal ventilation of the machine, being connected together, for example with the aid of stretchers as can be seen in FIG. 1, and are part of the support S of the machine which is adapted to be fixed on a fixed part of the vehicle.

In this way the bearing plates have air inlets and outlets.

In another version, and in a known way, the supports are in sealed contact with each other and are hollowed internally at their axially oriented outer periphery, so as to form a channel for flow of a coolant fluid such as the coolant fluid of the engine of the vehicle, so that the machine is cooled; this type of cooling is conventionally referred to as water cooling.

The support S carries, by the bearing plates 13 and 14, the stator 8 of the machine which is fixed internally at its outer periphery, and which comprises a body usually consisting of a stack of laminations, which carry coils or more generally windings, the outputs of which are connected to the rectifier and control bridge mentioned earlier herein.

The coils or windings of the stator consist of electrically conductive wires, which are for example so configured as to form star connected and delta connected windings in the manner described for example in the document FR-A-2 737 063, or else windings in the form of electrically conductive bars as described for example in the documents WO92/06527 and WO02/50976 filed on 21 Dec. 2001; the bars may be of rectangular cross section. The wires or bars extend through the body of the stator 8, from which they are electrically insulated, and are connected together to form networks which extend on either side of the body of the stator 8, thereby constituting a first chignon and a second chignon.

More precisely, and in the known way, the machine has several phases, each of which has an input end and an output end, and the wires or bars are connected together in order to form the said networks and to connect the input of the phase to the output of the phase, by forming at least one winding per phase. Accordingly, the machine may be of the three phase or six phase type, as in FIGS. 2 to 6 of the document WO02/50976 (US-A-2003/0011268), in slots formed in each lamination of the body of the stator. In a modified version, the wires or bars extend centrally through the stator body, being insulated from the latter, and are fixed to the body of the stator by resin in the manner described for example in the document U.S. Pat. No. 5,097,167.

The stator 8, which constitutes the armature of the machine when the latter is working in alternator mode, surrounds the rotor 4, which in the alternator mode constitutes the inductor of the machine. The brushes, via the brush carrier 16, are connected to a voltage regulator device of the alternator for maintaining the alternator voltage at a desired value, which in this example is of the order of 14V when used with a 12V battery.

The rectifier and control bridge, the electronic command and control module for the rectifier bridge, the arms of which are part of a command and control unit, are arranged in this example in an electronic unit mounted on the outside of the machine. In one version, the same is true for the voltage regulator device.

In a further version, the command and control unit is mounted on the machine at the rear, for example, in the manner described for example in the document FR 01 16088 filed on 12 Dec. 2001 and published under the No. FR-A-2 835 978, or at the outer periphery of the latter.

The voltage regulator device is, in one modified version, mounted on the outside of the command unit, while being connected electrically to it. All combinations are possible.

The said unit carries switching means which in this example comprise power interrupters, an electronic command and control unit, and a hyperexcitation circuit.

The electronic module includes a computer such as a microcontroller, which receives information from sensors 52 which will be described later herein.

The machine, constituting an alternator-starter, has in this example stator coils or windings together with a rectifier bridge, all of which are mounted in parallel with a battery of the vehicle, and an excitation winding carried by the rotor and fixed to it, the excitation winding being supplied with power through a hyperexcitation circuit.

This hyperexcitation circuit is active in the starter mode (when the alternator-starter is working as an electric motor), so as to maximise the starting torque of the alternator-starter and so as more easily to start the internal combustion engine, also called a heat engine, of the motor vehicle, during either cold starting or starting after, for example, stopping at a red light when the engine has been stopped to reduce fuel consumption, thereby performing a function called "stop and go".

The hyperexcitation circuit receives at its input the on-board network voltage delivered by the battery and/or the alternator, and it delivers to the terminals of the excitation winding a voltage which is greater than the said on-board network voltage.

As mentioned above, the apparatus also includes switching means (for example a power interrupter), which are commanded by the electronic command and control module.

The command and control module is associated with the voltage regulator device of the alternator, and it commands the switch for example, by means of a pulse width modulated signal.

Equally, the command and control unit, of which the module is a part, may include means which, in the case where the alternator-starter would discharge on the on-board network by being disconnected from the battery (i.e. in the case of a "load dump", a term generally used by people working in this field), enable opening of the power switch to be commanded immediately, whereby to produce rapid de-magnetisation of the alternator, and especially of its rotor.

The hyperexcitation circuit also works when the machine is operating in its alternator mode.

In another version, the excitation winding of the rotor 4 may be formed using a configurating tool, so as to give the latter at its outer periphery a pointed form or a barrel shape, so that the winding comes as near as possible to the axial teeth of the claw-type rotor, as is described for example in the document WO01/93406 filed on 29 May 2001. This favours hyper-excitation.

The alternator-starter can of course be mounted in association with the clutch of the motor vehicle, as is described for example in the document FR-A-2 782 356 filed on 28 Jul. 1999.

Thus, the rotor of the alternator-starter can be mounted between the internal combustion engine of the motor vehicle and the reaction plate of the friction clutch.

In a modified version the rotor can be mounted downstream of the friction clutch.

In both cases, the rotor is driven in rotation by the engine flywheel of the vehicle, which is coupled in rotation to a crankshaft of the engine of the vehicle.

The rotor may be carried by the engine flywheel which drives the friction clutch in rotation, the reaction plate then constituting the rear end of the engine shaft.

As mentioned above, the flywheel may be made in two parts, such that the rotor is in this case carried by the primary part fixed in rotation to the crankshaft, or the secondary part fixed with respect to the reaction plate of the clutch, which is adapted to cooperate with a friction plate of the friction disc of the clutch. Resilient members, and also, in some cases, a torque limiter, are interposed operatively between these two parts of the flywheel so as to give good damping of vibrations and so as to constitute a double damping flywheel. In a modified version, the two said parts are fixed together, one of them being able to be axially flexible so as to form a flexible flywheel.

The alternator-starter may be brushless. In a modified version, the alternator-starter has a salient pole rotor, with excitation windings associated with each pole. In yet another version, and as described in the document WO02/054 566, the rotor has excitation windings and permanent magnets incorporated in the rotor and arranged alternately, the excitation windings being wound around the salient poles which are stamped out in the stack of laminations of the rotor, while the permanent magnets are received in housings formed in the stack of laminations of the rotor, and are closed at each of their axial ends by a retaining member, which has a non-magnetic portion adapted to come into abutment with the magnets.

Means are also provided for following the angular position of the rotor, for the purpose of injecting electric current into the appropriate phase, and therefore into the appropriate winding of the stator, at the right moment when the machine is working in electric motor mode.

These means, which according to one aspect which is not limiting of the magnetic type, pass information to the electronic command and control module, that is to say to the command and control unit, and are described for example in the document WO01/69762 filed on 9 Mar. 2001.

Thus, in FIG. 3, a target 50 is fixed on a target carrier which is mounted on the rotor 4 for rotation with it. The target carrier is mounted axially between the rotor 4 and the rear bearing plate 14, radially inwards of the blades 45 of the fan 44. This target carrier acts as a spacer between the rotor 4 and the inner ring of the ball bearing in the rear bearing plate 14, and partly surrounds the outer ring of that ball bearing, as can be seen in the drawings of the said document WO01/69762. A sensor carrier 53 is mounted on the transverse base portion of the rear bearing plate, and in this example it carries three sensors 52, which are of the linear type in accordance with one feature of the invention.

The sensors are dephased from each other (out of phase) by 120 electrical degrees ($2\pi/3$).

In this example, the target 50 is of continuous annular form. This target 50 is magnetic, and carries alternate north and south poles. Reading by the sensors 52, with a threshold, is of the radial type. For this purpose, the sensor carrier 53, which is for example of plastics material, has axially oriented portions 55 which, in this example, extend through a large hole 54 in the bearing plate 14. Each portion 55 carries a sensor 52 which is fitted radially outwards of the axially oriented target 50 carried by the outer periphery of the target carrier. The sensor carrier 53 has ears 56 with oblong holes, each of which has a bolt 57, for fastening to the base portion of the bearing plate 14, passing through it. The portions 55 are disposed radially inwards of the blades 45. The sensor carrier 53 thus has a position which is adjustable circumferentially with respect to the bearing plate 14. A perforated protective cover 17 covers the rear part of the machine, and in particular the brush carrier 16 and sensor carrier 53. This cover 17 is fixed on the rear bearing plate 14, which, with the front bearing plate 13, constitutes the fixed support S for the stator 8 of the machine, which is of the synchronous type.

In a modified version, reading of the target is axial, the sensors then being located axially facing the target through the hole 54. In a further modification, the target carrier is located between the base portion of the front bearing plate 13 and the rotor, instead of the spacer 70 in abutment on the inner ring of the ball bearing 11. The sensor carrier 53 is then secured on the front bearing plate 13 in such a way that its circumferential position is adjustable.

In a further version, the target is fixed on the pulley 1, in facing relationship with the sensor carrier, which is carried in such a way that its circumferential position is adjustable on the front bearing plate 13 in the manner described in the document FR 2 807 231; reading of the target is here either of the axial or radial type.

In yet another modification, the target carrier is integral with the appropriate fan and fixed with respect to the rotor as in FIG. 12 of the document WO02/060711.

In a still further version, the sensors are mounted on a carrier member which carries the stator of the machine at its outer periphery and which defines a precise air gap with the rotor. The engine flywheel carries the rotor of the machine as well as the reaction plate of the clutch. Bearing means, such as for example at least one ball bearing, are interposed operatively between the engine flywheel and the inner periphery of the carrier member, which comprises a U-shaped portion which partially surrounds the rotor and carries the magnetic target. The sensors are fitted in facing relationship with this target in a manner similar to that described in FIGS. 23 to 25 of the document FR 2 802 592 filed on 20 Dec. 2000, the magnetic target replacing the code wheel. The machine is then of the synchronous type.

In accordance with one aspect of the invention, which is not limiting, the target comprises a number of pairs of north and south magnetic poles identical to the arrangement in the rotor 4. The target carrier is either non-magnetic or, in another version, magnetic. The target may comprise ferrites and/or rare earths. In a modification, the target is magnetised with the aid of windings, or includes inert sectors which are fluxed by the magnetic rotor field.

The means for following the angular position of the rotor are therefore of the magnetic type, and comprise sensors of the linear type in the manner mentioned above. In one embodiment the sensors are Hall Effect sensors of the linear type, but in another version they are magneto-resistive sensors.

In all cases, the sensors 52 transmit information, in this example in the form of signals, to the electronic module of the unit for command and control of the bridge. In this example three sensors are provided, with one sensor for each phase, the machine being of the three phase type, and the signals from the sensors being in the known way separated (dephased) by a phase difference which is an angle of 120 electrical degrees, for the sequential supply of power to the phases of the stator 8, thereby enabling a rotating electromagnetic field to be created.

Figure 4:
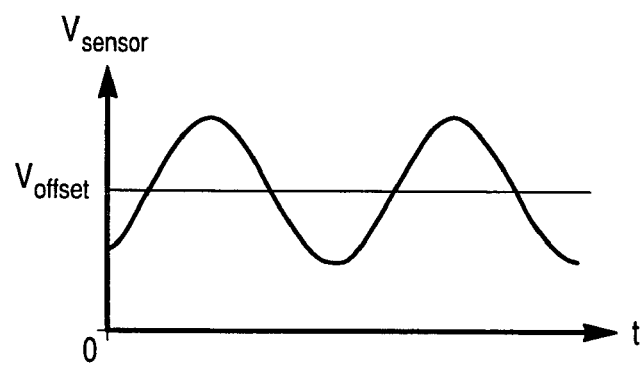
FIG. 4 shows the characteristic curve (of voltage against time) after a sensor signal, of the linear type used in the realisation of the invention, has been read from the magnetic target.

FIG. 4 shows the sinusoidal signal delivered by one of the linear type sensors after reading of the magnetic target.

In this curve, the ordinate V represents a voltage, and the abscissa t represents time.

The signal is generally sinusoidal due to the presence of the magnetic target. With this type of signal, it is possible to know the instantaneous position of the rotor 4 of the machine.

FIG. 4 shows the presence of a voltage offset (V offset). This offset is due to the presence of the rotor 4, and more precisely to the magnetisation of the rotor due to the presence of at least one excitation winding of the rotor, which influences the signal delivered by the sensor after reading of the magnetic target.

Noise and saturation of the sensors are also produced.

All of this affects the signal delivered by the sensor in such a way that the latter is not centred on zero in FIG. 4.

Figure 5:
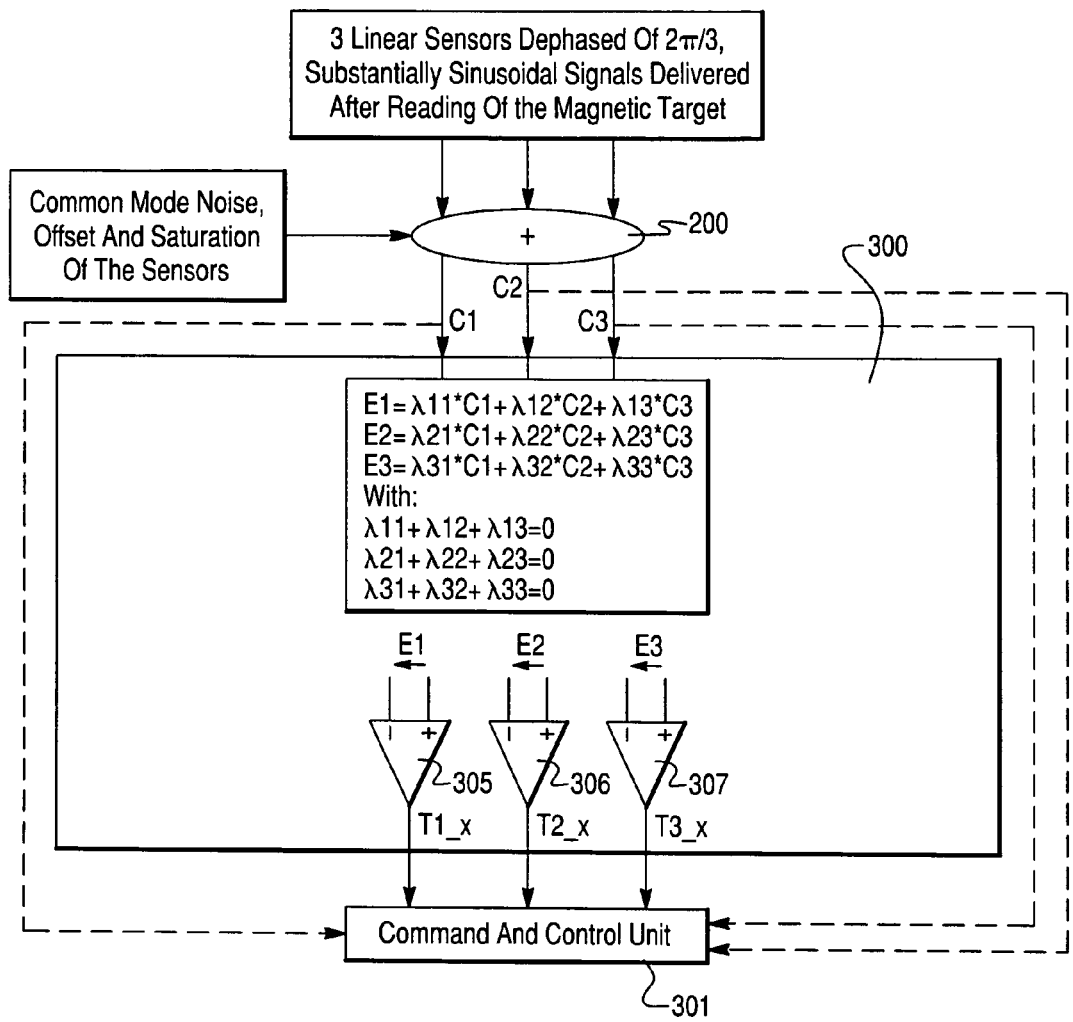
FIG. 5 is a diagram illustrating the invention.

This is shown diagrammatically by FIG. 5, by the block 200 which indicates that each signal from a sensor is augmented in particular by the offset in FIG. 4.

The invention makes use of these sensors of the linear type in order to augment the torque delivered by the machine when the latter is working in its electric motor mode.

Thus, in accordance with the invention, there is performed in a processing unit 300 a summation of the signals which are delivered by the sensors, by applying to these latter a coefficient to create out of phase signals, the number of which is equal to the number of sensors. For each out of phase signal, the sum of the coefficients is zero.

In the embodiment described, the rotary electrical machine is of the three phase type, and therefore three sensors, that is to say one sensor per phase, are provided.

Thus the unit 300 receives the signals C1, C2 and C3 delivered by the three sensors 52 and affected by noise, by offset and by saturation of the sensors. The signals C1, C2 and C3 are then delivered by the unit 200.

Figure 2:
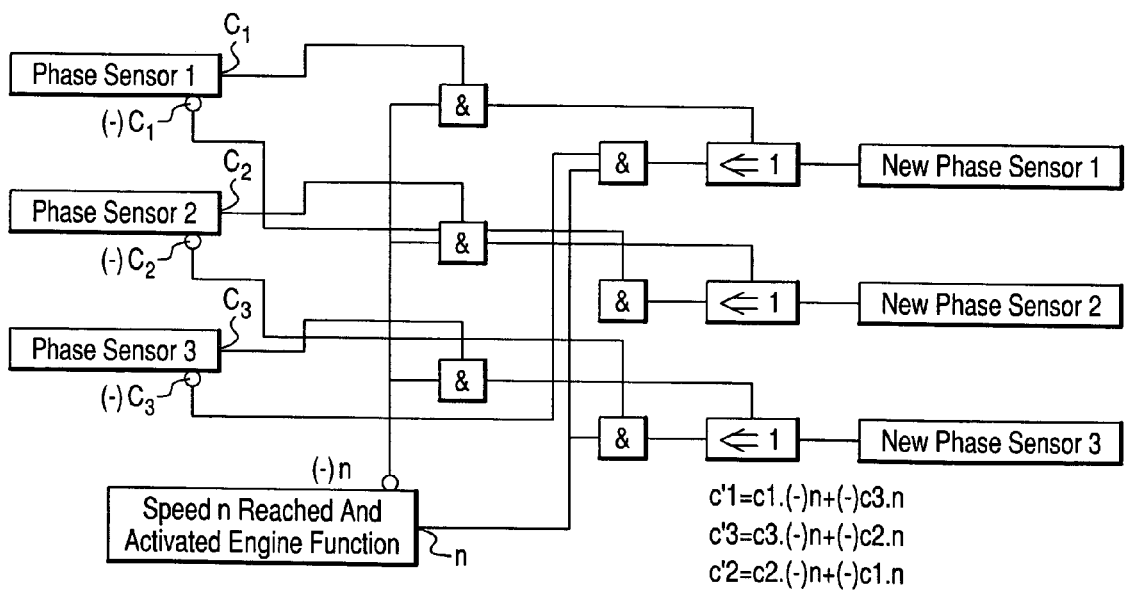
FIG. 2 shows a power supply circuit in one possible form of realisation in accordance with the document WO02/060711.

FIG. 5 illustrates the invention, the output signals T1_x, T2_x and T3_x corresponding to the signals of the new sensors in FIG. 2.

The augmentation of the torque can be seen in FIG. 1. More precisely, the curves C and D of the prior art are joined together by the curve G, which is obtained by virtue of the invention, and the increase in the torque is represented by a hatched zone.

FIG. 8 shows, as in the documents FR-A-2 745 444 and FR-A-2 7445444 [sic], to which reference should be made for more detail, a diagram of the reversible electrical machine according to the invention which includes the processing unit 300.

Accordingly, we see the sensors 52, of the linear type, and the said processing unit 300 with its input signals C1 to C3 and its output signals T1_x to T3_x, connected electrically to the electronic command and control module 301 of the command and control unit 301.

In FIG. 8, the references 1, 4 and 8 designate, respectively, the pulley 1 of the machine, the rotor with its excitation winding which is indicated diagrammatically, and the stator which is indicated diagrammatically by its coils or windings which, in this example, are delta wound, with one winding for each phase.

The reference 201 designates the rectifying and control bridge associated with the machine and connected to the phase outputs of the stator of the machine, that is to say to the stator windings.

This bridge is part of the command and control unit, and it constitutes a power stage of the latter. The bridge 201 is controlled by the electronic command and control module 301 of the bridge, constituting a stage of lower power than that of the bridge. The unit 301 includes for example drivers (controllers) which have logic circuits for controlling the bridge, together with a computer such as a microcontroller.

The bridge 201 is connected between earth and the positive terminal of the battery B of the vehicle. In this example, it includes transistors 70 of the MOSFET type which incorporate, by construction, a diode 60 between their drain and their source.

In the electric motor mode, the diodes work as freewheel diodes, the bridge then being a wave generator with arms, while in the electrical generator mode they work as a rectifier bridge as in a conventional alternator. The transistors 70 therefore, and in the known way, perform at the same time the functions of interrupters and freewheel diodes.

The electronic command and control module 301 of the bridge 201 delivers, in the electric motor mode (wave generator mode) signals A, B and C on the grids of the transistors 70 connected to earth, and signals A', B' and C' on the grids of the transistors 70 which are connected to the positive terminal of the battery B of the vehicle. For this purpose, the module 301 has drivers associated with each of the signals T1_X, T2_X and T3_X, so as to generate the signals A to C'.

The reference 90 represents the voltage regulator, and the reference 110 the ignition key and its associated interrupter. The module 301 also controls a transistor 100 of the MOSFET type connected to the regulator 90 so as to short circuit the latter in the electric motor mode.

Thanks to the invention, it is possible to obtain sensor offsets which are continuously variable over the whole range of speeds, so that it is possible for optical torque to be obtained over this range. For this purpose, it is sufficient to have a phase setting that has regard to the amplitude of the sensor signals C1, C2 and C3 (see FIG. 4), and to compare them with the same sensor signals C1, C2 and C3, and more precisely with the absolute value of the alternate component of the signals C1, C2 and C3, which do not have regard to the offset due to the presence of the wound rotor.

Figure 6:
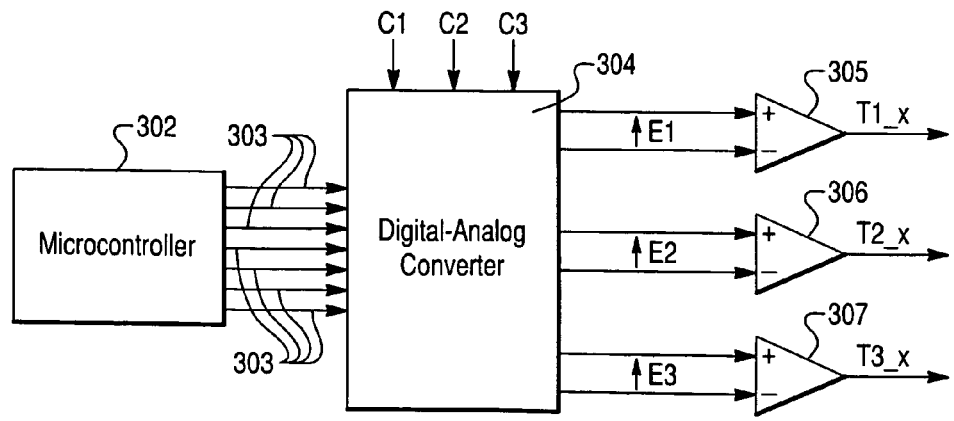
FIG. 6 is a diagram of a first embodiment according to the invention, with continuously variable signals de-phased as a function of the speed of rotation of the machine.

A microcontroller achieves this result in the embodiment shown in FIG. 6.

Accordingly, in FIG. 6, the processing unit includes a microcontroller 302 which is connected through electrical links 303 to a digital-analogue converter 304, which is itself connected to the comparators 305 to 307, which deliver the associated signals T1_x, T2_x and T3_x to the drivers of the module 301 that generates the signals A to C'. The converter 304 receives the signals C1 to C3.

A linear analogue circuit (consisting of capacitors and resistors) also enables an offset to be obtained for at least one sensor, and in accordance with an aspect of the invention which is not limiting, offset of the sensors as a function of the velocity of rotation of the rotor.

Figure 7:
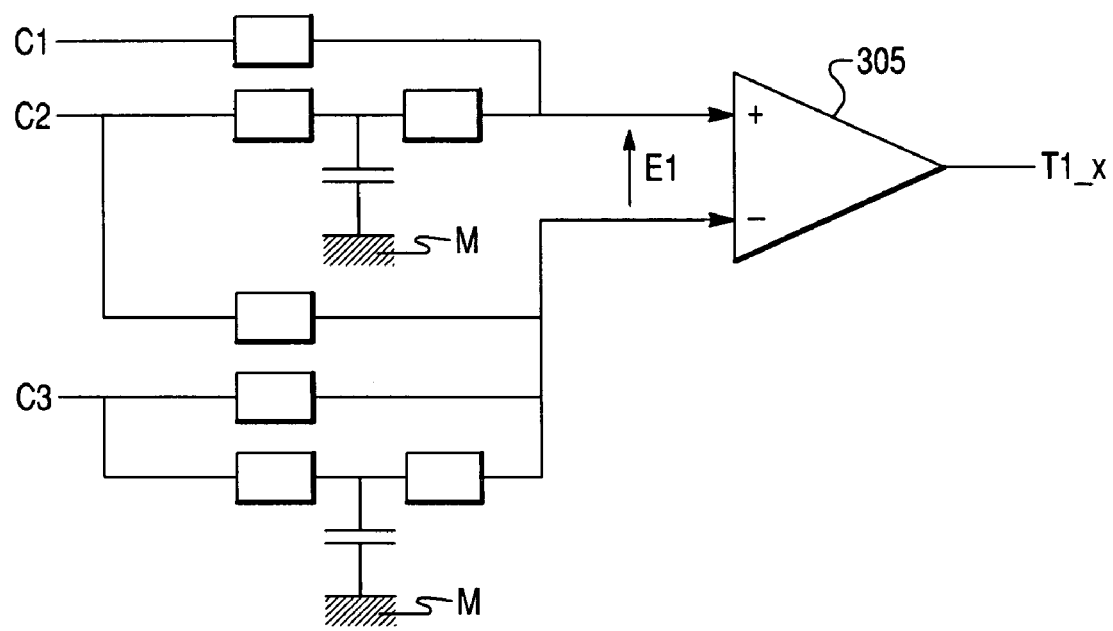
FIG. 7 is a partial view similar to FIG. 6 but for a second embodiment.

FIG. 7 shows such a circuit in part. In this Figure, the resistors are represented by rectangles and the capacitors are shown conventionally, M being earth. For more details, especially as regards the electrical links, in particular with the + and − inputs of the comparator which in this example is the comparator 305, reference is directed to FIG. 7, given that the diagram is the same for the other comparators 306 and 307.

In accordance with an aspect of the invention, which is not limiting, a linear combination of the sensors is obtained, such that the sum of the coefficients is zero (with common mode noise and offset being thereby eliminated).

The signals C1, C2 and C3 are approximately sinusoidal, and their value is expressed in the following imaginary numbers:

$$c_1 = e^{\overline{\omega}t}$$

$$c_2 = e^{j(\overline{\omega}t + 2\pi/3)}$$

$$c_3 = e^{j(\overline{\omega}t - 2\pi/3)}$$

The coefficients λ are calculated so as to add a phase difference θ in such a way that $$e^{j(\overline{\omega}t+\theta)} = {}^3\Sigma_{i=1} \lambda_i \cdot ci$$

where $${}^3\Sigma_{i=1} \lambda_i = 0$$

FIG. 5 mentions these coefficients and therefore the value E1 to E3 corresponding to the differences in potential between the positive inputs (non-inverting) and the negative inputs (inverting) of the comparators 305 to 307.

More precisely, in order to simplify the arrangement for the negative coefficients λ, the inverting inputs (−) of the comparators are used so as to limit the number of components. No comparison is made with respect to 0. For positive coefficients λ, the non-inverting inputs (+) of the comparators are used.

In another version, offsets are obtained in a discrete manner.

Thus, in one embodiment, a phase offset of 30□ is obtained for the signals from the sensors in a simple way, for a predetermined rotational velocity of the machine which is lower than that in the prior art as illustrated in FIG. 1 (velocities of the order of 800 revolutions per minute are impossible with sensors of the all-or-nothing type).

For negative coefficients λ, the inverting inputs (−) of the comparators are used in the way explained above, to limit the number of components.

In that case, the value of the coefficients associated with the signals E1, E2 and E3 are, respectively, 1 −1 0, 0 1 −1, and −1 0 1.

In other words, the signals from the sensors (those coming from the unit 200) are compared in pairs in the comparators 305 to 307. E1 is then equal to C1−C2, E2 is equal to C2−C3, and E3 is equal to −C1+C3.

In order to overcome problems which are connected in particular with offset, it is possible to get the sum of all the signals, then to divide it by three, and then to compare the result with the instantaneous signals.

Thus, as in the document WO02/060711 mentioned earlier, in a first step the signals C1 to C33 are used directly, and then in a second step the signals, out of phase by 30□, are used in the manner explained above, and finally in a third step (dephasing by 60□) a permutation and inversion of the signals is effected as in the document WO02/060711. It is for this reason that in FIGS. 5 and 8 the connections between the signals and the module 301 are shown in broken lines, the module 301 accordingly being adapted to receive six items of information. In the first step the signals C1 to C3 are transmitted directly into the module 301. In the second step the module 301 receives the items of information T1_x to T3_x.

It is of course possible to perform other switching and inversion operations. For example, in an additional fourth step, de-phasing by 90□ is carried out.

The speeds of rotation of the machine for which the various phases are effected are determined as a function of the machine, and are stored in the module 301.

As regards the circuit for hyperexcitation and rapid demagnetisation, it is of course possible to make use of all the solutions described in the document WO02/060711.

Thus, in one embodiment, when the machine is working in starter mode, in particular for starting the motor vehicle, the hyperexcitation (voltage and/or current delivered by the hyperexcitation circuit) is greater than the hyperexcitation in the alternator mode, so that the torque (and therefore the power) of starting obtained from the alternator-starter is maximised. The augmentation of the amount of excitation is obtained for example by applying an over-voltage to the terminals of the excitation winding of the rotor, or by an electronic over-voltage generator.

With the invention, it is possible to have regenerative braking.

Thus, with the said electrical machine connected to the on-board wiring network of the vehicle in the alternator mode, the braking mode of the vehicle is activated with recovery of energy during braking phases of the motor vehicle.

During these braking phases, the amount of excitation is augmented in order to take a higher torque from the engine. The recovered energy is stored in an energy storage device.

The energy storage device is for example a capacitor of ultra high capacity.

The energy stored in the energy storage device is restored to the on-board wiring network for a fresh starting operation of the alternator-starter, or for supply of power to connected current consuming equipment.

In another version, the energy stored in the energy storage device is restored to the alternator-starter working in its electric motor mode or in a stop mode.

In summary, in the embodiment shown in FIG. 5 according to the invention, the following formula is obtained:

$$E1=\lambda 11*C1+\lambda 12*C2+\lambda 13*C3$$

$$E2=\lambda 21*C1+\lambda 22*C2+23*C3$$

$$E3=\lambda 31*C1+\lambda 32*C2+\lambda 33*C3$$

with $$\lambda 11+\lambda 12+\lambda 13=0$$

$$\lambda 21+\lambda 22+\lambda 23=0$$

$$\lambda 31+\lambda 32+\lambda 33=0$$

In yet another version, the means for following rotation of the rotor can of course be of the optical type.

In yet another version, the machine has more than three phases, so that it is provided with more than three sensors. For example, in a five phase machine, which is for example star connected, five sensors are provided. In a modified version for a machine of the six phase type, there are six sensors.

All combinations are of course possible.

The invention claimed is:

1. A method of controlling a polyphase, reversible, rotary electrical machine of the kind called an alternator-starter for a motor vehicle with a heat engine, the said machine being adapted to work either as an electrical generator—in an alternator mode—or as an electric motor, the said machine comprising a rotor (4), a polyphase stator (8) carrying a plurality of windings, a command and control unit, which includes a rectifying and control bridge (201) associated with the rotary electrical machine and connected to the windings of the stator of the said machine, and means for following the angular position of the rotor, the said means including a target and sensors (52) for detecting the passage of the target and for transmitting items of information to the command and control unit, characterised in that, starting from sensors of the linear type delivering signals of a sinusoidal type after reading the target, a summation of the signals delivered by the sensors is performed in a processing unit (300), by applying a coefficient to the sensors to create signals which are out of phase with each other and the number of which is equal to the number of sensors.

2. A method according to claim 1, characterised in that the means for following the angular position of the rotor are of the magnetic type.

3. A method according to claim 1, characterised in that the processing unit (300) includes comparators having inverting inputs (−) and non-inverting inputs (+), and in that the inverting inputs (−) of the comparators are used for negative coefficients ($\lambda$), and the non-inverting inputs (+) of the comparators are used for positive coefficients ($\lambda$).

4. A method according to claim 3, characterised in that the processing unit comprises a microcontroller (302) connected through electrical links (303) to a digital-analogue converter (304) which is itself connected to the comparators (305 to 307).

5. A method according to claim 3, characterised in that the signals from the sensors are compared in pairs in the comparators.

6. A method according to claim 5, characterised in that the machine has three phases, and in that three sensors are provided, with one sensor per phase.

7. A method according to claim 1, characterised in that for each out of phase signal, the sum of the coefficients is zero.

* * * * *